(12) United States Patent
Wendling

(10) Patent No.: US 9,975,526 B2
(45) Date of Patent: May 22, 2018

(54) FURNITURE ROLLER STOP

(71) Applicant: Allan Wendling, New Lothrop, MI (US)

(72) Inventor: Allan Wendling, New Lothrop, MI (US)

( * ) Notice: Subject to any disclaimer, the term of this patent is extended or adjusted under 35 U.S.C. 154(b) by 0 days. days.

(21) Appl. No.: 15/278,429

(22) Filed: Sep. 28, 2016

(65) Prior Publication Data
US 2018/0086319 A1    Mar. 29, 2018

(51) Int. Cl.
*B60T 3/00*    (2006.01)
*B60B 33/00*   (2006.01)

(52) U.S. Cl.
CPC ............. *B60T 3/00* (2013.01); *B60B 33/0089* (2013.01)

(58) Field of Classification Search
CPC ........... B60T 3/00; B60B 33/0089; B64F 1/16
USPC ...................................... 188/1.12, 4 R, 5, 32
See application file for complete search history.

(56) References Cited

U.S. PATENT DOCUMENTS

| | | | | |
|---|---|---|---|---|
| 2,850,117 A * | 9/1958 | Gersmehl, Sr. | ..... | B60B 33/0089 188/32 |
| 3,258,088 A * | 6/1966 | Bowen | ...................... | B64F 1/16 188/32 |
| 3,684,060 A * | 8/1972 | Waddle | .................... | B61K 7/20 188/32 |
| 3,811,536 A * | 5/1974 | Haynes | ..................... | B60T 3/00 188/32 |
| 4,615,416 A * | 10/1986 | Wilson | ..................... | B60T 3/00 188/32 |
| 5,266,378 A * | 11/1993 | Stephenson | ............... | B60T 3/00 188/32 |
| 5,513,727 A * | 5/1996 | Belanger | ................... | B60T 3/00 188/32 |
| 6,113,170 A * | 9/2000 | Daniel | ................. | A63C 11/025 24/16 R |
| 2001/0040073 A1* | 11/2001 | Agtuca | ..................... | B60T 3/00 188/32 |

* cited by examiner

*Primary Examiner* — Thomas J Williams
(74) *Attorney, Agent, or Firm* — Dinsmore & Shohl LLP

(57) ABSTRACT

A furniture roller stop having a U-shaped body constructed from a flexible material. The body includes two spaced apart side legs and a base leg connecting the side legs together thus forming a channel between the side legs dimensioned to fit around the roller of the furniture so that the side legs are positioned closely adjacent the roller. A bendable band is attached to the body and extends around the base leg and at least a portion of each side leg. The shape of the channel is adjustable by bending the band which thereafter retains the bent side legs in the new position.

4 Claims, 2 Drawing Sheets

FURNITURE ROLLER STOP

BACKGROUND OF THE INVENTION

I. Field of the Invention

The present invention relates generally to a furniture stop for use with furniture mounted on rollers.

II. Description of Related Art

Many different types of furniture, such as beds, are mounted on rollers so that the furniture can be easily moved from one location to another. However, it is oftentimes desirable to prevent the further movement of the roller once the furniture has been moved to its desired position.

In some cases, the roller itself contains a brake which may be activated by a lever extending out from the roller. These previously known rollers are effective in preventing rotation of the wheels on the roller. However, such wheels are oftentimes rotatably mounted to the furniture itself so that, even when the rollers are locked against movement, some movement of the furniture itself is still possible.

Still other types of roller stops are positioned underneath the roller on the furniture. Oftentimes, the furniture stop includes an upwardly facing cavity in which the roller is received. These roller stops, however, have not proven entirely effective for supporting heavy furniture, such as beds, since the furniture itself damages the roller stop. However, if the roller simply rests upon the ground surface and is surrounded by the roller stop, some movement of the roller is nevertheless possible.

SUMMARY OF THE PRESENT INVENTION

The present invention provides an adjustable roller stop that overcomes all of the above-mentioned disadvantages of the previously known roller stops.

In brief, the roller stop of the present invention comprises a U-shaped body having a pair of spaced and parallel side legs and a base leg and constructed of a flexible material. Preferably, the flexible material includes a synthetic rubber for both durability and flexibility. Other materials, however, may alternatively be used.

The side legs of the body are spaced apart from each other so that, when positioned around a roller, the roller rests upon the ground support surface while the side legs surround the sides of the roller. In order to enable adjustability of the spacing between the side legs and to ensure that both side legs contact the furniture roller, an elongated bendable band preferably constructed of metal is attached to one side of the body. The band, furthermore, is dimensioned so that the band extends entirely along the base leg and at least along a portion of each side leg. The band, furthermore, enjoys high plasticity so that the band may be bent and, once bent, retains its bent shape.

Consequently, once the furniture with rollers is positioned in the desired position, the furniture roller stop is positioned around the wheel of the furniture so that the two side legs of the furniture stop are positioned adjacent the roller surface of the roller. The side legs are then deformed so that the side legs frictionally engage the wheel on the furniture. In doing so, the bendable band is also bent to a new shape so that, upon release of pressure on the roller stop, it maintains its non-deformed position with two sides of the roller stop in engagement with the roller for the furniture.

Preferably, the facing sides of the roller stop are slanted or curved towards each other to substantially conform to the shape of the wheel. In doing this, the area of frictional engagement between the roller stop and the wheel is increased thus providing a firmer grip between the roller stop and the wheel.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

With reference first to FIGS. 1-4, a preferred embodiment of the roller stop 10 according to the present invention is shown. The roller stop 10 includes a generally U-shaped body 12 having a pair of spaced apart and generally parallel side legs 14 and a base leg 16 which connects one end of the side legs 14 together. Preferably, the side legs 14 and base leg 16 are of a one-piece construction and made from a synthetic plastic or rubber material.

Figure 1:
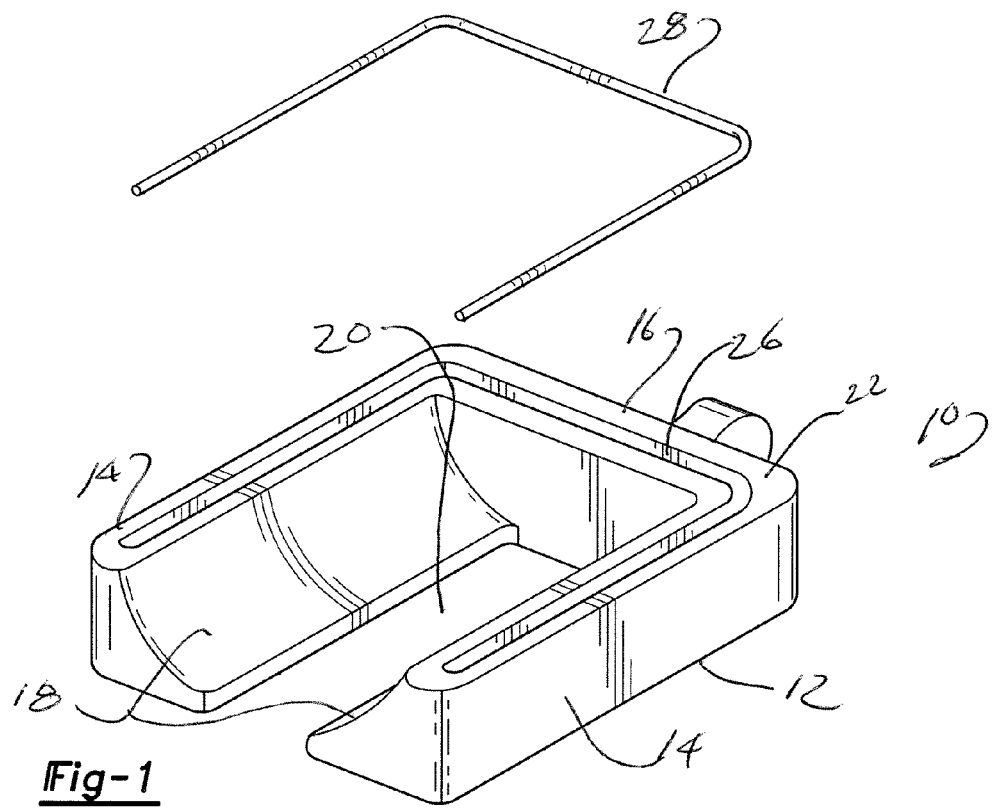
FIG. 1 is an exploded elevational view illustrating a preferred embodiment of the present invention.
Figure 6:
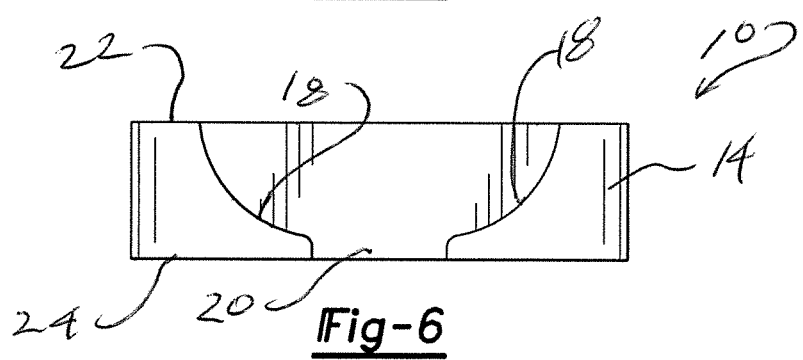
FIG. 6 is a second end view thereof.

With reference now particularly to FIG. 1, the facing sides 18 of the side legs 14 are spaced apart from each other thus forming a channel 20 therebetween. In addition, as best shown in FIGS. 1 and 6, the facing sides 18 of the legs 14 are curved on an arc together from a top 22 of the roller support 10 to a bottom 24 of the roller support 10.

Figures 2, 3:
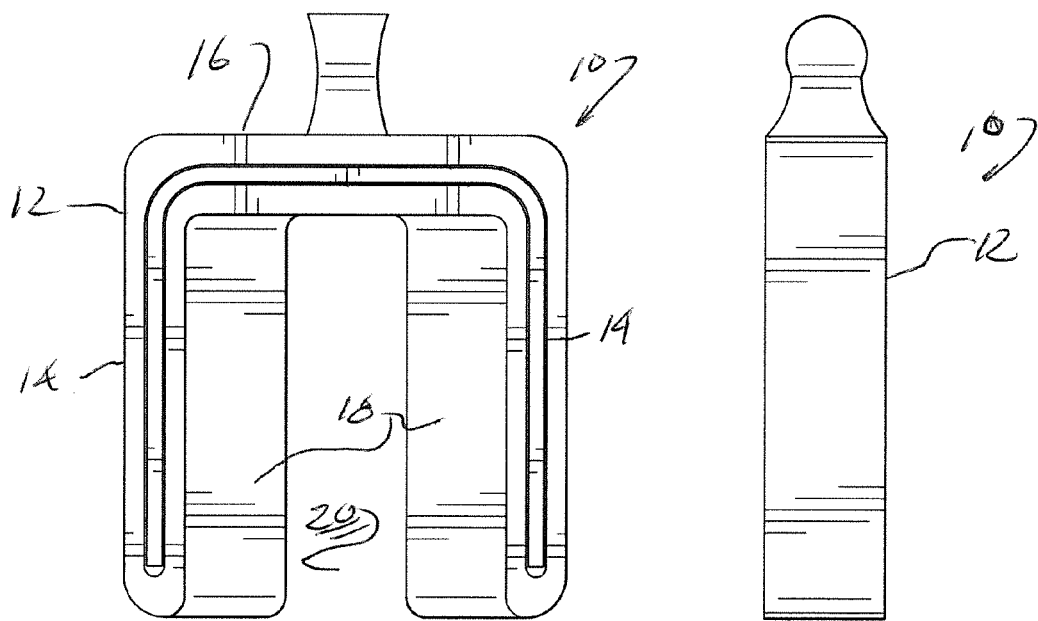
FIG. 2 is a top plan view thereof.
FIG. 3 is a side view thereof.
Figure 4:
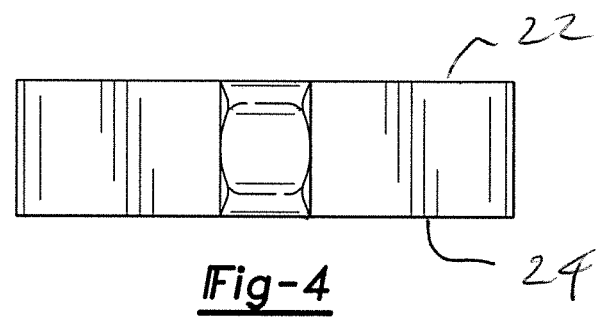
FIG. 4 is a top end view thereof.
Figure 5:
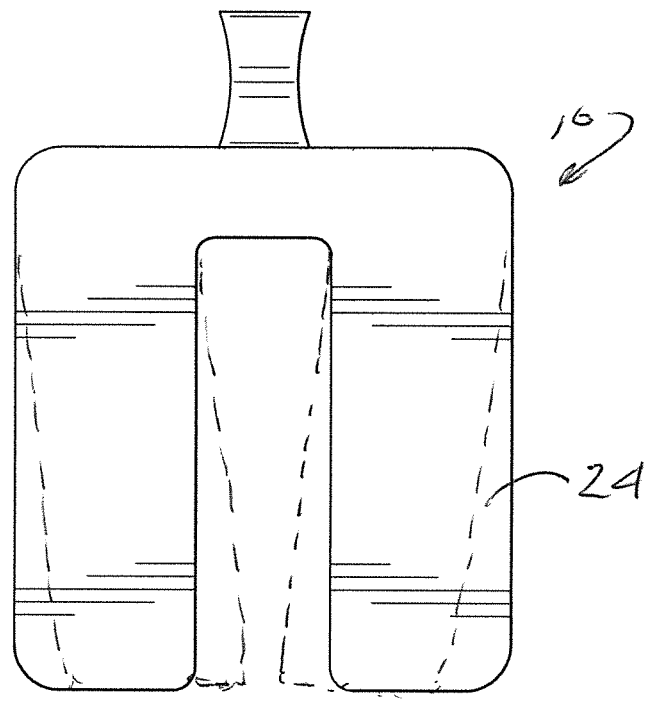
FIG. 5 is a bottom view thereof.

With reference now to FIGS. 1 and 2, a U-shaped slot 26 is formed through the top 22 of the base leg 16 and at least a portion of each side leg 14. The slot 26 is dimensioned to receive a U-shaped bendable band 28 such that the band, when inserted into the slot 26, is nested within the body 12 of the furniture stop 10. This band 28, furthermore, may be made of any suitable material, but is preferably made of a metal or metal alloy that it is bendable and, once bent, retains its bent shape. Consequently, with the band 28 inserted into the body 12 as previously described, the side legs 14 may be bent toward or away from each other and, once bent, retained in the bent position, or substantially in the bent position, by the metal band 28. An exemplary bent position is illustrated in phantom line in FIG. 5.

In operation, once the furniture with rollers is positioned in its desired position, the stop 10 is slid around the wheel so that the curved surfaces of the wheel face the curved surfaces 18 of the roller stop. The roller stop 10 is then deformed so that the surfaces 18, or at least a portion of the surfaces 18, engage and hold the wheeled surfaces against rotation. In doing so, the side legs may be deflected as illustrated in the example shown in FIG. 5.

After the sides 14 of the roller stop 10 engage the roller surface of the wheel, upon release, the metal band 28 retains the side of the roller stop 10 in abutment with the wheel and prevents rotation or other movement of the wheel.

Having described my invention, many modifications thereto will become apparent to those skilled in the art to which it pertains without deviation from the spirit of the invention as defined by the scope of the appended claims.

I claim:

1. A furniture roller stop comprising:
a one piece U-shaped body constructed of a flexible material, said body having two spaced apart side legs, a base leg connecting two ends of said side legs together and forming a channel dimensioned to fit around the roller so that said side legs are positioned closely adjacent the roller,
a one piece bendable band attached to said body and extending along said base leg and at least a portion of each side leg,
wherein the shape of said channel is adjustable by bending said band;
wherein said band is contained in a groove formed in said base leg and both said side legs.

2. The invention as defined in claim 1 wherein said body is made of a polymer.

3. The invention as defined in claim 2 wherein said polymer comprises a synthetic rubber.

4. The invention as defined in claim 1 wherein facing sides of said side legs slant toward each other.

* * * * *